United States Patent Office 3,317,618
Patented May 2, 1967

3,317,618
PROCESS FOR COUPLING HALOGENATED ORGANIC COMPOUNDS AND PRODUCTS THEREOF
Robert Neville Haszeldine, Windyridge, Lyme Road, Disley, Cheshire, England
No Drawing. Continuation of application Ser. No. 680,924, Aug. 27, 1957. This application Mar. 12, 1962, Ser. No. 179,217
Claims priority, application Great Britain, Sept. 15, 1952, 23,160/52; Aug. 9, 1954, 23,106/54; May 25, 1955, 15,157/55; Sept. 6, 1956, 27,343/56; Jan. 15, 1957, 1,537/57
13 Claims. (Cl. 260—653)

This invention pertains generally to a method for coupling certain halogenated organic compounds and in particular to a method for coupling certain secondary and tertiary organic compounds containing fluorine, and other halogens.

This application is a continuation of my copending application Ser. No. 680,924, filed Aug. 27, 1957, now abandoned, which application is a continuation-in-part of application Ser. No. 526,087, filed Aug. 2, 1955, and now abandoned. The latter application was itself a continuation-in-part of my application Ser. No. 377,716, filed Aug. 31, 1953, now also abandoned. Application Ser. No. 680,924 is also a continuation-in-part of application Ser. No. 377,716.

Organic halogenated compounds are of great industrial importance. In particular, organic compounds containing fluorine are becoming of increasing industrial importance because of their remarkable resistance to chemical and thermal attack. In many instances, however, it is difficult or expensive to manufacture compounds having the requisite molecular size; or known methods of manufacture result in products which contain loosely bonded groups which detract from the inherent stability of the molecule. Thus, for example, it is known that the compound $$CF_3[CF_2CF(CF_3)]_2I$$

can be made by the reaction of $CF_3I$ and $CF_2=CFCF_3$. Homologues of this compound are potentially attractive lubricants but the iodine atom is relatively easily displaced, rendering them unstable. Moreover it is in many cases desirable to have a greater molecular weight than is afforded by the compound itself.

In accordance with the present invention, this compound and other similar compounds can be coupled to form stable adducts of greater molecular size. In the particular case cited above the coupled product is stable to heat and chemical attack and provides useful lubricants and plasticizers as will be described in more detail below.

Specifically the present invention provides new and useful compounds having the general formula

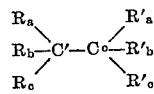

where $R_a$ and $R'_a$ are selected from the group consisting of hydrogen, halogen, alkyl, halogenoalkyl, alkenyl, and halogenoalkenyl groups having from 1 to about 20 carbon atoms, cycloalkyl, halogenocycloalkyl, alkenyl and halogenocycloalkenyl groups having from 3 to 6 carbon atoms, aryl and halogenoaryl groups where, $R_b$ is selected from the group consisting of halogen, alkyl, halogenoalkyl, alkenyl, and halogenoalkenyl groups having from 1 to about 20 carbon atoms, cycloalkyl, halogenocycloalkyl, akenyl and halogenocycloalkenyl groups having from 3 to 6 carbon atoms, aryl and halogenoaryl groups, and where $R'_b$ and $R_c$ and $R'_c$ are selected from the group consisting of alkyl, halogenoalkyl, alkenyl, and halogenoalkenyl groups having from 1 to about 20 carbon atoms, cycloalkyl, halogenocycloalkyl, alkenyl and halogenocycloalkenyl groups having from 3 to 6 carbon atoms, aryl and halogenoaryl groups; provided that when both $R_a$ and $R_b$ are other than halogen $R_c$ has at least two halogen atoms other than iodine on the carbon atom attached to the $C'$ carbon atom; and when $R'_a$ is other than halogen, $R'_c$ has at least 2 halogen atoms other than iodine on the carbon atoms adjacent the $C°$ carbon atom.

Preferably, at least one of $R_a$, $R_b$ and $R_c$ and at least one of $R'_a$, $R'_b$ and $R'_c$ is perfluoro- or perfluorochloroalkyl, cycloalkyl, alkenyl, cycloalkenyl or aryl.

Compounds of this general structure may be formed, according to the invention by coupling reactions involving three types of polyhalogen compounds, viz: primary compounds

(Formula 1)

where X is hydrogen or halogen, Y is halogen, Z is chlorine, bromine or iodine, and $R_c$ is alkyl, halogenoalkyl, alkenyl, and halogenoalkenyl groups having from 1 to about 20 carbon atoms, cycloalkyl, halogenocycloalkyl, alkenyl and halogenocycloalkenyl groups having from 3 to 6 carbon atoms, aryl and halogenoaryl groups; secondary compounds

(Formula 2)

where X is hydrogen or halogen, $R_c$ is alkyl, halogenoalkyl, alkenyl, and halogenoalkenyl groups having from 1 to about 20 carbon atoms, cycloalkyl, halogenocycloalkyl, alkyl, alkenyl and halogenocycloalkenyl groups having from 3 to 6 carbon atoms, aryl and halogenoaryl groups, and $R_d$ is alkyl, halogenoalkyl, alkenyl, and halogenoalkenyl groups having from 1 to about 20 carbon atoms, cycloalkyl, halogenocycloalkyl, alkenyl and halogenocycloalkenyl groups having from 3 to 6 carbon atoms, aryl and halogenoaryl groups provided that if X is H, $R_d$ has halogens other than iodine on the carbon atom adjacent the $C'$ carbon; and tertiary compounds

(Formula 3)

where $R_c$ and $R_d$ are alkyl, halogenoalkyl, alkenyl, and halogenoalkenyl groups having from 1 to about 20 carbon atoms, cycloalkyl, halogenocycloalkyl, alkenyl and halogenocycloalkenyl groups having from 3 to 6 carbon atoms, aryl and halogenoaryl groups, and $R_d$ has two halogen atoms other than iodine on the carbon atom adjacent the $C'$ carbon atom.

In accordance with the invention, a primary compound (Formula 1) can be coupled with a secondary (Formula 2) or tertiary (Formula 3) compound to give compounds of the type

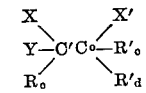

(Formula 4)

where $X'$, $R'_c$ and $R'_d$ are equal to $R_c$ and $R_d$ in Formula 2 above; and

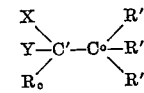

(Formula 5)

wherein $R'_c$ and $R'_d$ are equal to $R_c$ and $R_d$ in Formula 3 above.

In compounds of the type of Formula 4, X' is preferably F or Br, and at least one of $R_d$ and $R'_d$ contains fluorine. X and Y are preferably not iodine. When X' is H, preferably $R'_d$ has a fluorine atom on the carbon atom adjacent the C° carbon.

In compounds of the type of Formula 5, X and Y are preferably other than iodine and $R'_d$ preferably has fluorine on the carbon adjacent the C° carbon.

Again, in accordance with the invention, a secondary compound (Formula 2) can be coupled with another secondary or with a tertiary (Formula 3) compound. The resultant products are

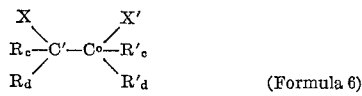
(Formula 6)

where X', $R'_c$ and $R'_d$ are as given above for X, $R_c$ and $R_d$ in Formula 2; and

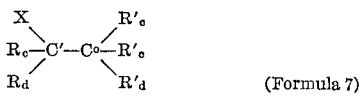
(Formula 7)

where $R'_c$ and $R'_d$ are as defined above in Formula 3.

In compounds of the type of Formula 6, X and X' are preferably F or Br. $R_c$ and $R'_c$ preferably contain fluorine. When X is H, X' is preferably fluorine or $R_d$ and $R'_d$ have fluorine on the carbon atom adjacent the C' and C° carbon atoms. When X' is H, X is preferably halogen other than bromine and $R'_d$ has fluorine on the carbon adjacent the C° carbon atoms.

In compounds of the type of Formula 7, when X is H, $R_d$ and $R'_d$ have fluorine on the carbon adjacent the C' carbon atoms. X is halogen preferably, however, other than iodine, and in this case $R'_d$ preferably has fluorine on the carbon adjacent the C° carbon atom. Preferably X is F.

Finally the invention embraces the reactions of two tertiary compounds (Formula 3). Here the products have the formula

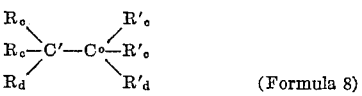
(Formula 8)

where $R_c$, $R'_c$, $R_d$ and $R'_d$ are given above in Formula 3. It is preferred that $R_d$ and $R'_d$ have fluorine on the carbon atom adjacent the C' and C° carbon atom.

Of particular interest are reactions involving secondary and tertiary reactions where the $R_c$ and $R_d$ groups are polyfluoroalkyl, and polyfluorochloroalkyl, particularly perfluoroalkyl and perfluorochloroalkyl groups.

Examples of such products include those derived from telomers or adducts of the type $$R_f[R_vCF(R_w)]_nZ'$$

where $R_f$ is a perhalogenoalkyl, preferably a perfluoroalkyl or perfluorochloroalkyl group, of say 1 to 20 carbon atoms, $R_v$ is an alkylidene group of say 1 to 4 carbon atoms, $R_w$ is fluoroalkyl or fluorochloroalklyl of 1 to 20 carbon atoms, n is from 1 to say 20 and Z' is bromine or iodine.

The coupled products have the formula $$R_f[R_vCF(R_w)]_n[(R_w)CFR_v]_mR_f$$

there being not more than say 50 carbon atoms in the whole molecule.

Typical of this class of compounds are those having the formula $$R_f[CF_2CF(CF_3)]_n[(CF_3)CFCF_2]_nR_f$$

Again tertiary compounds of the type

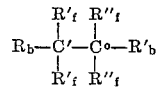

where $R_b$ and $R'_b$ are as above and $R'_f$ and $R''_f$ are perfluoroalkyl or polyfluoroalkyl having at least 2 fluorine atoms on the carbons adjacent the C' and C° carbons and having say 1 to 30 carbon atoms, may be made according to the invention.

Examples of suitable groups for $R'_f$ and $R''_f$ are $CF_3$—, $C_2F_5$—, $C_3F_7$— or other similar acyclic groups or cyclic groups such as $C_6F_{11}$—, $C_5F_6$—, $C_4F_7$— or $C_6F_5$—.

Two techniques may be used in coupling compounds according to the invention.

In one method, according to the invention, the compound, or compounds, to be coupled are subjected to energization to raise the energy level of the compound or compounds sufficiently to cause fission of the C—Z bond and formation of the free radical $R_aR_bR_cC\cdot$. This may be accomplished in any convenient way; for example by heat, ultra-violet, infra-red, X, γ, or high energy electron radiation, and the particular form of energization chosen will depend on the particular compound or compounds being reacted and on factors of convenience and practicability.

In accordance with this aspect of the invention, the reaction is preferably but not necessarily, carried out in the presence of a halogen acceptor such as zinc, magnesium, tin, iron, cadmium, mercury and other metals; NaOH, KI, $Na_2S_2O_3$ and $R_aSNa$ where $R_a$ is an organic radical. In an especially convenient embodiment of the invention, the reaction is carried out using ultra-violet radiation in the presence of mercury.

The reaction conditions used will vary greatly depending upon the reactants and the particular method chosen. Thus for example, where ultra-violet or other radiation is employed with or without a halogen acceptor the reaction may be carried out at from say —30° C. to 350° C., usually from room temperature to say 200° C. Where heat alone is used without other energization and with or without a halogen acceptor, the minimum temperature required to effect fission is normally on the order of 20 to 450° C., usually between about 50 and about 280° C.

In the reactions according to the invention which are carried out by means of free radical mechanisms, i.e. by radiation or heat with or without a halogen acceptor, pressure is not an important factor and may range from say 0.1 mm. to superatmospheric, for example, to 500 atmospheres absolute. Normally pressures of 1 to 20 atmospheres are employed. Reaction time is again not critical and may be from 5 minutes to 5 weeks, depending on the temperature and pressure.

In certain cases it may be desirable to carry out the free radical reactions in the presence of a solvent. When used, the solvent chosen should be one which is inert to the reactant or reactants and to the product or products. Other characteristics may be prescribed by the particular reaction being carried out; for example, where ultra-violet radiation is employed the solvent should be substantially transparent to radiation in the range 250–350 mu. Often the reaction product is a suitable solvent. Examples of other useful solvents are perfluoromethylcyclohexane, $$CF_2ClCFCl_2, CF_2ClCFCl$$

$$CFClCF_2Cl, CF_3CF_2CF_2CF_2Cl, (C_4F_9)_2O, (C_3F_7)_3N$$

It will be understood, however, that where the coupling reaction is carried out by a free radical mechanism, the use of a solvent is not necessary and is simply a matter of convenience.

In an alternative process, according to the invention, the coupling may be carried out by bringing the compound, or compounds, to be coupled into contact with a dehalogenating metal, such for example, as zinc, magnesium, tin, iron, aluminum, copper or cadmium in the presence of a suitable solvent.

When the coupling is carried out by means of a dehalogenating metal, the metal attacks the C—Z bond in the compounds to be coupled, removing the Z atom and in this way performing the function of the ultra-violet or other energizing agency in the first method referred to above. The reaction conditions which favor intermolecular, rather than intramolecular dehalogenation are in general provided by a temperature between about −20° C. and about 300° C., usually between about 0° C. and about 150° C., the precise temperature depending on the boiling point of the solvent used and on the pressure. Generally speaking, moreover, higher temperature within the stated range are used for intermolecular dechlorination than for debromination or deiodination. The pressure may range from sub-atmospheric, say 10 mm. Hg absolute to superatmospheric, say 100 atmospheres absolute. Normally it will be from about 100 mm. Hg to about 5 atmospheres absolute. The reaction time is not critical. To obtain a yield in excess of 60% it may range from 5 minutes to say 2 weeks, depending on temperature, pressure and the particular reactants.

Where a dehalogenating metal is to be used, it is necessary to use a solvent. The solvent should be an organic compound preferably having a dielectric constant greater than 1.5. Preferably it will be a Lewis base, and preferably, though not necessarily, it will be free from acid hydrogens. Examples of suitable solvents are dioxane, benzene, acetic anhydride, and aliphatic mono- and polyhydric alcohols having more than 2, say from 3 to 10, carbon atoms such as propanol, glycerol, hexanol and decanol.

In the practice of the methods of the invention, it is preferred to effect the coupling reaction by intermolecular deiodination as opposed to debromination or dechlorination as the former is more readily achieved, although the preference for intermolecular deiodination is less when using a tertiary starting material. Further, in primary compounds, the substituents X and Y are preferably different from Z although X and Y may be the same; also it is preferred that X represent halogen as opposed to hydrogen. In the case of a secondary starting material it is preferred that X should be different from Z.

Where a tertiary starting material is employed, it is preferred that all three of the subtended groups be polyhalogenated other than polyiodinated. It may also be noted that the more halogen atoms in the groups, the greater the ease with which the coupling reaction proceeds. This latter statement applies also to the R and R' groups in the compounds of the type $R_cCXYZ$ and $R_cR_dXYZ$. Fluorine, chlorine and bromine substituents in the groups of the three general Formulae 1, 2 and 3 given above promote the coupling reaction in increasing order.

Turning now to more specific aspects thereof, the methods of the invention find particular application in the production of halogenated polyenes, particularly perfluorodienes, other fluorodienes, perfluorochlorodienes and other fluorochlorodienes. While many methods may be employed in preparing the starting materials for the production of the above compounds, such starting materials may in many cases be most fruitfully derived from alkenes, halogenoalkenes, acetylenes and halogenoacetylenes by addition to these compounds of iodine monochloride or monobromide, the addition product being subjected to a coupling and subsequent dehalogenation and/ or dehydrohalogenation reaction. Where the iodine halide addition reaction is selected for the preparation of starting material, it should also be pointed out that the coupling reaction of the invention may occur to some extent in situ.

It should be noted that the addition of an iodine halide to an alkene or an acetylene does not necessarily constitute the only or most preferred method available for the preparation of compounds to which the coupling procedure may be applied. Among other methods available for the preparation of the starting compounds $R_cCXYZ$, $R_cR_dXZ$ and $R_cR_cR_cZ$ are those set forth below:

(a) The addition of compounds of the type $R_xCX'Y'Z'$, $R_xR_yCY'Z'$ or $R_xR_yR_zCZ'$ to unsaturated linkages in acetylenic or alkene derivatives, X' or Y' representing fluorine, bromine, chlorine or hydrogen (but not both hydrogen) and Z' representing chlorine, bromine or iodine, and $R_x$, $R_y$ and $R_z$ representing organic groups which need not necessarily contain halogen. The addition of $R_xCX'Y'Z'$ etc. to acetylenes or alkenes, including those containing halogen, may be effected by use of ultra-violet light or of a catalyst promoting free radical reactions (e.g., a peroxide), or by use of a catalyst promoting ionic reaction (e.g. a Friedel-Crafts type catalyst), or by any other means known to the art.

(b) The addition of hydrogen fluoride, chloride, bromide or iodide or of fluorine, chlorine, bromine or iodine to unsaturated linkages in acetylenic or olefinic derivatives.

(c) The halogenation by fluorine, bromine, chlorine or iodine of suitable compounds containing hydrogen.

(d) By metathesis reactions, e.g., by replacement of chlorine, bromine or iodine by fluorine.

(e) By dehydrohalogenation, dehalogenation, hydrogenation, dehydrogenation, decarboxylation, etc., of suitable compounds.

(f) By the process described and claimed in my copending applications Ser. No. 526,086, filed Aug. 2, 1955, now abandoned and its continuation-in-part, Ser. No. 680,914, filed Aug. 29, 1957, now abandoned. Ser. No. 526,086 is itself a continuation-in-part of my abandoned application Ser. No. 377, 716, filed Aug. 31, 1953. Reference may also be had to my U.K. patent applications Ser. Nos. 23,106/54 and 15,157/55, filed respectively Aug. 9, 1954, and May 25, 1955, which two U.K. patent applications have been consolidated and have matured into U.K. Pat. No. 824,229. As described in the above identified applications polymers and adducts of the general formula

$$n(CF_2X_1CClY_1)m(R_1)nZ_1$$

where $R_1$ may be fluoro alkene or fluoro polyene, $X_1$ is bromine or chlorine, $Y_1$ is chlorine or fluorine and $Z_1$ is bromine or iodine, where when $R_1$ is fluoro alkene, $n$ is unity and $m$ is an integer not greater than 20 and where when $R_1$ is fluoro polyene $n$ is an integer not greater than 20 and $m$ is an integer not greater than 30, can be made by reacting a fluoro alkene or a fluoropolyene with a perhalogenoethane having the general formula

$$CF_2X_1CClY_1Z_1$$

According to the copending application referred to, this reaction may be carried out under the influence of ultra-violet radiation, under heat with an initiator, under heat and ultra-violet radiation, under heat without either ultra-violet radiation or an initiator, or under the action of a radioactive initiator. Compounds so made can be coupled by the process described in the present application provided that the compound as a whole conforms to Formulas 1, 2, or 3 set forth above.

(g) By the process described in the copending application of Hauptschein et al. Ser. No. 614,821, filed Oct. 9, 1956, now abandoned, and its continuation-in-part application Ser. No. 701,995, filed Dec. 11, 1957, now Pat. No. 3,083,238, which teach the manufacture of telomers and adducts of difficultly polymerizable fluoroolefins and diolefins. Again it will be understood that only those compounds which conform to the Formulas 1, 2 and 3 above may be employed.

Certain of the compounds made in accordance with the invention may be coupled to give more unsaturated compounds. In general, for this reaction to be carried out it is only necessary that the compounds contain one or more

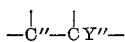

groups where X" is bromine or chlorine and Y" is hydrogen, chlorine or bromine. Dehalogenation or dehydrohalogenation may then be carried out to give the desired unsaturation.

An important specific application of the invention is the preparation of branched chain dienes starting with compounds represented by the formula $R_cR_dCYZ$. Depending on the starting compound, there are a number of possible routes to branched chain dienes of which a few will be considered below.

Consider first the situation where, in the formula $R_gR_hX''Z$ Z is chlorine, bromine or iodine, preferably the latter, X" is chlorine or bromine, $R_g$ is an aliphatic or halogenated aliphatic group, a cycloaliphatic or halogenated cycloaliphatic group, or an aromatic or halogenated aromatic group and $R_h$ is an alkyl or substituted alkyl group having a lower atomic weight halogen than X" attached to the alpha carbon atom. The starting compound $R_gR_hCX''Z$ is first subjected to the coupling reaction of the invention to yield $R_gR_hCX''CX''R_gR_h$ which compound is then intramolecularly dehalogenated by the removal of a halogen atom from the alpha carbon atom of each $R_h$ group and the removal of the two X" halogen atoms. An example of this type of reaction, which yields conjugated dienes, is represented below:

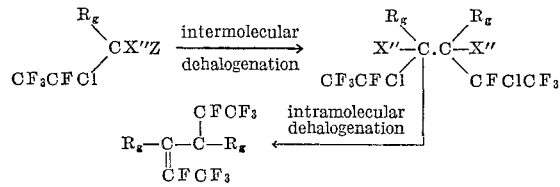

It should be noted that if the $R_h$ group in the starting material $R_gR_hCX''Z$ has no bromine or chlorine atom attached to its alpha carbon atom, then the product of the intramolecular dehalogenation of the compound $$R_gR_hCX''CX''R_gR_h$$

may be alkene as represented for example by the following reaction:

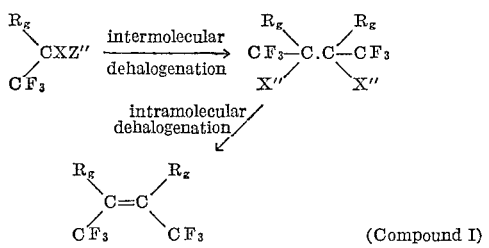

(Compound I)

Compound I above is to be regarded as representative of yet another class of alkenes which may be prepared by the application of the coupling procedure of the invention to suitable starting compounds, followed by dehalogenation and/or dehydrohalogenation; this class of alkenes may be defined by the following general formula:

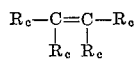

wherein $R_c$ is as defined above in Formula 2.

Another method of branched chain diene preparation involves the use of a starting compound $R_cR_kCX°Z$ such that the coupled product $R_cR_kCX°CX°R_cR_k$ while not susceptible to the removal by dehalogenation of a chlorine or bromine atom from the alpha carbon atom of each $R_k$ group and the two $X°$ halogen atoms, is susceptible to the dehalogenation or dehydrohalogenation of adjacent carbon atoms in each $R_k$ group. This method may be employed when in the formula $R_cR_kCX°Z$ $R_c$ and Z have the significance ascribed to them in the penultimate paragraph above, X° is chlorine, bromine or fluorine and $R_k$ is an alkyl or substituted alkyl group which contains two adjacent carbon atoms represented as:

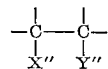

where X" is Cl or Br and Y" is H, Cl or Br. With a starting compound so constituted, the atoms represented by X" and Y" may be removed from the coupled product $R_cR_kCX°CX°R_cR_k$ by dehalogenation or dehydrohalogenation as the case may be to yield the desired diene. This route to (non-conjugated) branched chain dienes is illustrated by the reaction represented below.

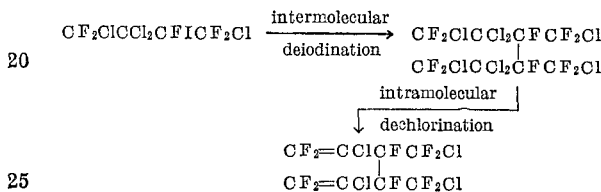

A third method of branched chain diene preparation involves the starting compound $R_mR_nCHZ$. In this case both $R_m$ and $R_n$ are polyhalogenated (other than polyiodinated) alkyl or substituted alkyl groups and Z is chlorine, bromine, or iodine. Where conjugated dienes are to be prepared, one of the groups $R_m$ or $R_n$ should contain bromine or chlorine on its alpha carbon atom and the desired diene is prepared by dehydrohalogenation. On the other hand where a non-conjugated diene is required, then one of the $R_m$ or $R_n$ groups should contain two adjacent carbon atoms of the form:

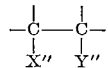

as described in the preceding paragraph. The two types of reactions are illustrated below using a starting compound $CF_2ClCCl_2CHICF_2Cl$ which may be conveniently prepared for example by the addition of iodine monochloride to $CF_2ClCCl_2CH=CF_2$:

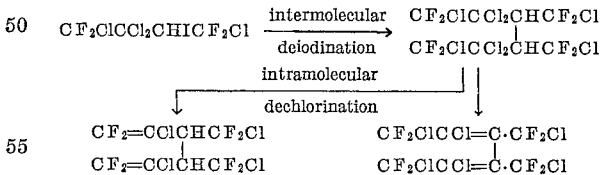

In the above described method of preparing branched chain dienes, the group $R_m$ in the starting material $$R_mR_nCHZ$$

will generally be an alkyl group, or a fluorinated and/or chlorinated alkyl group, and the $R_n$ group either a chloroalkyl group or a chlorofluoroalkyl group. The important branched chain dienes to be produced by the method are perfluorodienes, other fluorodienes, perfluorochlorodienes and other fluorochlorodienes.

Alternatively, branched chain dienes may be prepared without any intramolecular dehalogenation or dehydrohalogenation step by applying the coupling reaction of the invention to a starting material $R_mR_oXZ$ wherein the $R_o$ group instead of being a halogenated alkyl group as above described is an alkenyl or halogenoalkenyl group.

An example of this method of branched chain diene preparation is as follows:

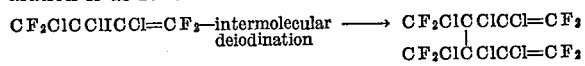

Branched chain dienes of particular interest which may be prepared in accordance with the process of the invention are represented by the general formula:

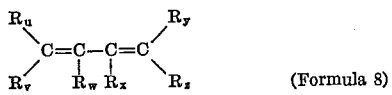

wherein the symbols $R_u$ to $R_z$ are appropriately selected (as dictated by the consideration that the formula represents a branched chain diene) to represent hydrogen, halogen, alkyl and halogenoalkyl groups. Compounds represented by the above formula are preferably perfluorodienes, other fluorodienes, perfluorochlorodienes and other fluorochlorodienes.

If, in Formula 8 given above, one or more of the groups $R_u$ to $R_z$ is an alkene group or halogenated (preferably fluorinated and/or chlorinated) alkene group, then of course the compounds represented will be polyenes having more than two ethylenic linkages in the molecule. Such polyenes are also important products of the present invention, particularly those classes of polyenes represented by the two following general formulae:

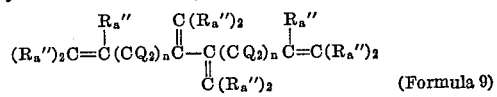

(Formula 9)

Formula 10 where $R_a''$ is $R_a$ as defined above, but does not include iodine, where Q is hydrogen, fluorine, chlorine, bromine or lower alkyl or halogenoalkyl of from say 1 to 4 carbon atoms and $n$ is 0 to say 20, the total number of carbon atoms in the molecules not exceding about 50. Preferably at least one of the carbon atoms adjacent the C′ and C₀ carbon atoms have fluorine subtended therefrom.

The preparation of branched chain polyenes in accordance with Formulae 9 and 10 above is illustrated by the following coupling reactions of which the first two result in a compound in accordance with Formula 9 and the third results in a compound in accordance with Formula 10, in all cases $n$ in the respective formula representing 0.

(1) 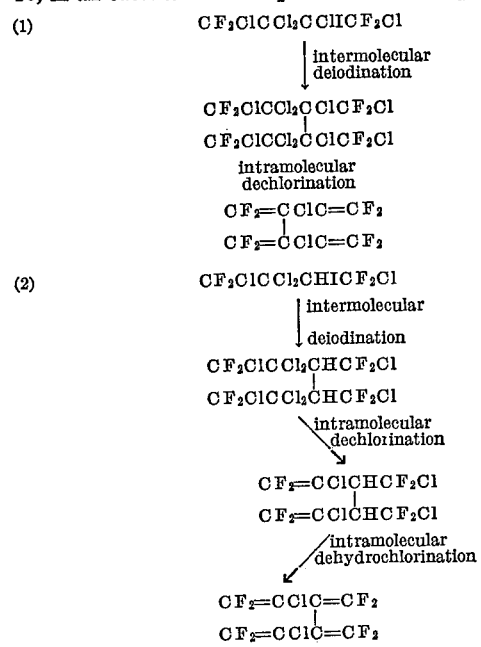

(2)

(3) 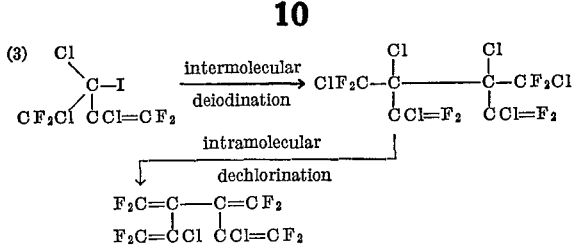

If the starting material for coupling reaction (3) mentioned immediately above, viz, the compound $$CF_2ClCClCCl=CF_2$$

is prepared by the addition reaction of iodine monochloride to the compound $CF_2=CClCCl=CF_2$, then one has an interesting example of a potentially important application of the invention in converting one diene into a different diene. In the particular case quoted the reaction would be represented thus:

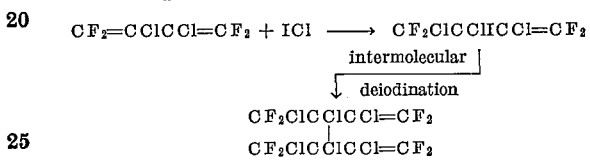

In view of the preceding description relating to the application of secondary starting compounds of the type $R_cR_dCXZ$ to the production of alkenes, it will at once be obvious that tertiary starting compounds of the type $R_cR_cR_dZ$ may be similarly employed, it being only necessary that one of the groups $R_c$ or $R_d$ contain two adjacent carbon atoms represented as

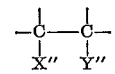

wherein as before X″ or Y″ represents bromine or chlorine, although either X″ or Y″ may represent hydrogen. Normally the $R_c$ and $R_d$ groups will be fluorinated and/or chlorinated alkyl or cycloalkyl groups. This aspect of the invention as applied to the production of a branched chain polyene is illustrated as follows:

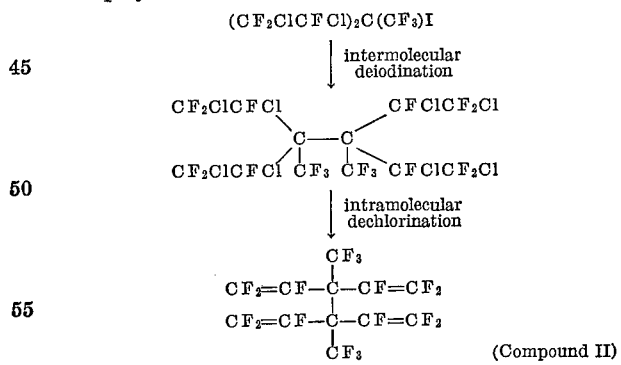

(Compound II)

Compound II above is an example of a member of a still further class of branched chain polyenes which may be prepared in accordance with the invention and which is represented by the general formula

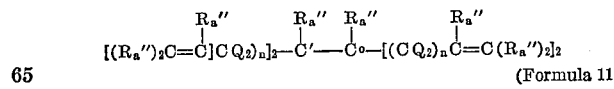

(Formula 11)

where $R_a''$, Q and $n$ are as defined above for Formulae 9 and 10. Again the molecule has a total of not more than about 50 carbon atoms and preferably at least one of the carbon atoms adjacent each of the C′ and C° carbon atoms has fluorine subtended therefrom.

The intramolecular dehalogenation or dehydrohalogenation reactions discussed above may be carried out using any conventional technique. Dehalogenation is normally accomplished by bringing the compound into reactive association with a halogen acceptor, for example, zinc dust, iron, magnesium or sodium amalgam. The reaction is preferably carried out in the presence of a solvent for the organic compounds involved. Examples of suitable solvents are alcohols such as methanol, ethanol, butanol, tetrahydropyran and tetrahydrofuran, glycols such as ethylene glycol; ethers and substituted amides.

The temperature at which the reaction occurs is normally the reflux temperature of the particular solvent used. Dehalogenation reactions may, however, be carried out at room temperature or below and in general the reaction temperature may range from 0 to say 200° C., normally between about 100° C. and about 120° C. Pressure is not critical and may range from say 200 mm. Hg absolute to 50 atmospheres. Normally, however, it will be from about 1 to about 20 atmospheres. Reaction time is again not critical. It may range from say 20 minutes to a week and is usually on the order of ½ to 10 hours.

It will be observed that the conditions first given for intramolecular dehalogenation overlap those previously given for intermolecular dehalogenation. It will be understood that in some coupling reactions using a dehalogenating metal, intramolecular dehalogenation will occur as a side reaction. When the nature of the initial compound to be coupled, is such that internal dehalogenation is favored to the extent that the yield of coupled product is unacceptably small, the other coupling process, i.e. energization to produce free radicals, is used.

Dehydrohalogenation reactions may be carried out by conventional procedures using alcoholic KOH or NaOH. In such reactions the temperature is normally between about −20° C. and about 160° C. Pressure is not critical and may be from say 0.1 to 15 atmospheres absolute. The reaction time may vary from about 15 minutes to about 48 hours.

Still another group of useful compounds can be prepared according to the present invention from certain specific types of the polymeric materials whose preparation and properties are described in my copending applications Ser. No. 526,086 and Ser. No. 680,914 referred to above and in the application of Hauptschein et al. Ser. No. 701,995 also referred to above.

These applications describe the preparation of telomers and adducts by the reaction of certain halogenated alkyl iodides and bromides with fluorinated unsaturated compounds. In general, any of these compounds may be coupled in accordance with the present invention, provided that one of the molecules to be coupled conforms to one of Formulas 1, 2, and 3 as set forth above and the other to Formulas 2 or 3. Of particular interest, as pointed out above, are compounds of the formula $$R_f[R_vCF(R_w)]_nZ'$$

where $n$ is 1 to say 20, $Z'$ is bromine or iodine, $R_f$ is perhalogenoalkyl, particularly perfluoroalkyl and perfluorochloroalkyl of 1–20 carbon atoms, $R_v$ is alkylidene of say 1–4 carbons, and $R_w$ is a fluoroalkyl or fluorochloro group of say 1–20 carbons. Preferably $R_w$ is perfluoro or perfluorochloro alkyl of 1–20 carbon atoms, perfluoro or perfluorochlorocycloalkyl of 3 to 6 carbon atoms; or perfluorochloroaryl. Suitable values for $R_f$— include $CF_2X''CClQ$— where $X''$ is Cl or Br and $Q'$ is F or Cl, for example, $CF_2ClCFCl$—; $CF_3$—, $C_2F$—, $C_4F_9$—, $C_3F_7$—, $CF_2Cl$—, $CF_2Br$—, and $(CF_3)(CF_2Cl)CF$—. Suitable values for the group $$-[R_vCF(R_w)]_n-$$

include —$CF_2CF(CF_2)$—, —$CF_2$—$CF(CF_2Cl)$—, and —$CFClCF(CF_3)$—.

The coupling reactions referred to above may be written as follows:

$R_f[R_vCF(R_w)]_nZ' + R_f[R_vCF(R_w)]_nZ' \longrightarrow$
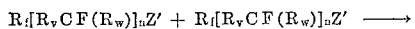
$R_f[R_vCF(R_w)]_n[(R_w)CFR_v]R_f$ In general the total number of carbons in the coupled product will not exceed about 50.

Illustrative of such reactions are the following:

$2CF_2ClCFCl[CF_2CF(CF_3)]_nI \longrightarrow$
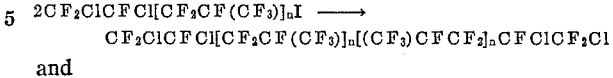
$CF_2ClCFCl[CF_2CF(CF_3)]_n[(CF_3)CFCF_2]_nCFClCF_2Cl$ and $2C_3F_7[CF_2CF(CF_3)]_nI \longrightarrow$
$C_3F_7[CF_2CF(CF_3)]_n[(CF_3)CFCF_2]_nC_3F_7$ When $R_f$ is $CF_2CClQ'$— a series of reactions are possible leading to various new and useful compounds.

Thus coupled compounds of the type referred to can be dehalogenated to give a diene such reaction being indicated as $[CF_2X''CClQ'[R_p][R'_p]CClQCF_2X'']$ $\downarrow$ dehalogenation $CF_2=CQ'[R_p][R'_p]CQ'=CF_2$ $R_p$ and $R'_p$ being the group —$[R_v$—$CF(R_w)]$— referred to above.

A typical reaction of this type is as follows:

$CF_3(CF_2)_mCF=CF_2 + CF_2ClCFClI$ $\downarrow$ addition $CF_3(CF_2)_mCFICF_2CFClCF_2Cl$ $\downarrow$ coupling $CF_3(CF_2)_mCFCF_2CFClCF_2Cl$
$CF_3(CF_2)_mCFCF_2CFClCF_2Cl$ $\downarrow$ dechlorination $CF_3(CF_2)_mCFCF_2CF=CF_2$
$CF_3(CF_2)_mCFCF_2CF=CF_2$ where $m$ is 0 to 20.

The conditions under which such dehalogenations can be carried out are those described for the more general reactions given above.

The terminally unsaturated compounds described above may be oxidized to form dicarboxylic acids. The general reaction may be written $CF_2=CQ'[R_p]_n[R'_p]_nCQ'=CF_2$ $\downarrow$ oxidation $HOOC[R_p]_n[R'_p]_nCOOH$ Illustrative of this type of reaction is the following specific case:

$CF_2=CF[CF_2CF(CF_3)]_n[(CF_3)CFCF_2]_nCF=CF_2$ $\downarrow$ oxidation $HOOC[CF_2CF(CF_3)]_n[(CF_3)CFCF_2]_nCOOH$ In carrying out the oxidation reactions described above, no special technique is required. Various conventional oxidizing agents such as alkali metal permanganates, e.g. potassium permanganates, alkali metal dichromates, e.g. potassium dichromate or ozone may be used but potassium permanganate is the preferred agent using the technique described by Haszeldine in "Journal of the Chemical Society" 4259 (1952).

The reaction is preferably carried out at a slightly elevated temperature, for example, at 30–60° C. or up to 200° C., but may be carried out at room temperature or even below room temperature, to say 0° C. Pressure is not critical and may be atmospheric or up to say 50 atmospheres. Reaction time is whatever is required to complete the particular oxidation being carried out.

It is usually on the order of one to several hours but may be up to 5 days.

The dicarboxylic acids whose preparation has been described above may be converted to their corresponding silver salts and these salts may then be subjected to reaction with halogen whereby they undergo decarboxylation with simultaneous halogenation to give substantial yields of a halogeno alkane. Although this reaction is known for the silver salts of perfluoro acids it was surprising to find it proceeds also with the silver salts of polyfluorochloro acids, since the latter exhibit properties markedly different from the corresponding perfluoro compounds.

This reaction may be written $$AgOOC[R_p]_n[R'_p]_n{-}Z_2 \rightarrow Z[R_p]_n[R'_p]_nZ$$

This reaction is normally carried out under anhydrous conditions at a temperature that may range from about $-30°$ C. to about $250°$ C., depending on the halogen used. Sub-atmospheric pressure is employed, ranging from 0.01 to say 500 mm. Hg absolute. Proportions are not critical and may range from 0.1 to 10 moles of halogen per mole of salt. Preferably, however, an excess of halogen is employed. The reaction time is normally from about one-half to about 24 hours.

The dicarboxylic acids may also be converted to the corresponding alkali metal salts, which on pyrolysis yield dienes having two less carbon atoms than their precursors. This may be exemplified by the following reaction.

$$MOOC[CF_2{-}CF(CF_3)]_n{-}[(CF_3)CFCF_2]_nCOOM \longrightarrow$$
$$CF_2C[CF_2{-}CF(CF_3)]_{n-1}[(CF_3)CF{-}CF_2]_{n-1}C{=}CF_2$$
$$\quad\quad | \quad\quad\quad\quad\quad\quad\quad\quad\quad\quad\quad\quad\quad |$$
$$\quad\quad CF_3 \quad\quad\quad\quad\quad\quad\quad\quad\quad\quad\quad\quad CF_3$$

M being an alkali metal and $n$ from 1 to about 20.

The pyrolysis is preferably performed under anhydrous conditions at temperatures of about $50°$ C. to about $350°$ C. The pressure is usually atmospheric or less, preferably 1–350 mm. Hg absolute.

Instead of converting the terminally unsaturated coupled adducts and polymers described earlier into carboxylic acids and derivatives of such acids, they may also be converted to surface active sulphonic acids and sulphonates, for example, by reaction of the terminally unsaturated compounds with an alkali metal bisulphite, particularly sodium bisulphite, followed by treatment with sulphuric acid if the free acid is desired.

This reaction may be written $$CF_2{=}CQ'(R_p)_n(R'_p)_nCQ'{=}CF_2$$
$$\downarrow MHSO_3$$
$$MSO_3CF_2CQ'H(R_p)_n(R'_p)_nCQ'HCF_2SO_3M$$

where M is an alkali metal.

This reaction is preferably carried out in an aqueous medium in the presence of a peroxide initiator. As examples of suitable initiators there may be cited benzoyl peroxide, acetyl peroxide, hexachloroacetyl peroxide, hexafluoroacetyl peroxide, di-tertiarybutyl-acetyl peroxide, $\alpha,\alpha'$-azo-di-isobutyronitrile and di-azomethane. The initiator is preferably used in a concentration of say 1–10% on the weight of the unsaturated compound. The reaction temperature may be from about $20°$ C. to about $300°$ C., preferably from about $50°$ C. to about $200°$ C. Pressure is not critical and may range from say 100 mm. absolute to on the order of 200 atmospheres. Preferably pressures of from atmospheric to about 30 atmospheres are used. The reaction time depends on the other conditions. Normally it is on the order of 1 to 48 hours.

In addition to the above noted examples of compounds that may be coupled in accordance with my invention, a number of other exemplary compounds of Formulae 1, 2, and 3 are listed below:

Formula 1

$CF_2ClCFClCF_2CCl_2Br$ $C_6H_5CCl_2I$ $C_2H_5CClBrI$ $CF_3CF_2CFClBr$ $CF_3CF_2CFBr_2$ $C_6F_{11}CHClI$ $C_5F_9CCl_2Br$ $C_4F_7CHClI$ $CF_3(CF_2)_nI$ $CF_3CFClCHBrI$ $\begin{matrix} CF_3 \\ \diagdown \\ \quad CFCF_2I \\ \diagup \\ CF_2Cl \end{matrix}$ $CCl_2{=}CFCHBrI$ $\begin{matrix} CF_3 \\ \diagdown \\ \quad CFCFClBr \\ \diagup \\ CF_3 \end{matrix}$ Formula 2

$\begin{matrix} C_6H_5 \\ \diagdown \\ \quad CCH \\ \diagup \\ CF_3 \end{matrix}$ $\begin{matrix} CF_3CFCl \\ \diagdown \\ \quad\quad CCH \\ \diagup \\ CF_3CFCl \end{matrix}$ $\begin{matrix} CF_2{=}CCl \\ \diagdown \\ \quad\quad CCH \\ \diagup \\ CF_2{=}CCl \end{matrix}$ $\begin{matrix} C_4F_7 \\ \diagdown \\ \quad CHI \\ \diagup \\ C_6F_{11} \end{matrix}$ $\begin{matrix} CF_3 \\ \diagdown \\ \quad CCH \\ \diagup \\ C_6H_5 \end{matrix}$ $\begin{matrix} C_6F_{11} \\ \diagdown \\ \quad CCBrI \\ \diagup \\ CH_3 \end{matrix}$ Formula 3

$\begin{matrix} CF_3 \\ \diagdown \\ CF_3{-}C{-}I \\ \diagup \\ CF_3 \end{matrix}$ $\begin{matrix} C_4F_9 \\ \diagdown \\ C_6F_{13}{-}C{-}Cl \\ \diagup \\ C_6F_5 \end{matrix}$ $\begin{matrix} CF_2{=}CF\quad CF_3 \\ \diagdown\quad | \\ \quad\quad C{-}I \\ \diagup \\ CF_2{=}CF \end{matrix}$ $(CF_3CHFCFCl)_3C{-}I$ $\begin{matrix} CF_3 \\ \diagdown \\ \quad CHI \\ \diagup \\ CF_2Cl \end{matrix}$ $\begin{matrix} CF_2BrCFBrCF_2 \\ \diagdown \\ \quad\quad\quad\quad CCH \\ \diagup \\ CF_2BrCFBrCF_2 \end{matrix}$ $\begin{matrix} CCl_3 \\ \diagdown \\ \quad CBrI \\ \diagup \\ CFCl_2 \end{matrix}$ $\begin{matrix} CHF_2 \\ \diagdown \\ \quad CClBr \\ \diagup \\ C_7F_{13} \end{matrix}$ $(CF_3)_2CBr_2$ $\left( \begin{matrix} CH_2F \\ \diagdown \\ \quad CHCH_2 \\ \diagup \\ CCl_3 \end{matrix} \right)_2 {=} CFI$ $\begin{matrix} \text{Naphyl} \\ \diagdown \\ C_6F_{11}{-}C{-}Br \\ \diagup \\ CHF_2 \end{matrix}$ $\begin{matrix} CH_2F \\ \diagdown \\ \quad CHCH_3 \\ \diagup \\ CF_3\quad CF_3{-}C{-}I \\ \quad\quad\quad | \\ \quad\quad\quad CH_2 \end{matrix}$ $\begin{matrix} CF_2{=}CClCF_2 \\ \diagdown \\ CH_3{-}C{-}Br \\ \diagup \\ C_3F_7 \end{matrix}$ $\begin{matrix} CF_2ClCFClCF_2 \\ \diagdown \\ CF_2ClCFClCF_2{-}C{-}I \\ \diagup \\ CF_2ClCFCl \end{matrix}$ $\left[ \begin{matrix} F \quad F \\ F{-}\langle\;\;\rangle \\ F \quad F \end{matrix} \right]_2 {=} C \begin{matrix} I \\ | \\ {-}\langle Cl\;Cl \rangle{-}Cl \\ Cl\;Cl \end{matrix}$ It has also been found that certain of the compounds disclosed in my copending application Ser. No. 526,086 may be reacted with molecular oxygen to give products which include coupled compounds. In its most generalized form this reaction can be written $$R_s{-}\underset{R_s}{\overset{R_t}{C}}Z'' + R_s{-}\underset{R_s}{\overset{R_t}{C}}Z'' \xrightarrow{O_2} R_s{-}\underset{R_s}{\overset{R_t}{C}}{-}\underset{R_s}{\overset{R_t}{C}}{-}R_s$$

wherein $R_s$ is selected from the group consisting of perfluoro and perfluorochloro alkyl, cycloalkyl and aryl groups, $R_t$ is $R_s$, fluorine or chlorine and Z is iodine, the total number of carbons in the product not exceeding about 50.

A more specific reaction is written:

$$2CF_2ClCFCl[CF_2CF(CF_3)]_nI$$

$$\downarrow O_2$$

$$CF_2ClCFCl[CF_2CF(CF_3)]_n[(CF_3)CFCF_2]_nCFClClCF_2$$

This reaction may be carried out using oxygen and ultraviolet light with or without heat, oxygen with heat and an initiator such as one of the peroxide initiators listed above or with heat and oxygen alone. When ultraviolet light is used, the reaction temperature will usually range from room temperature (20° C.) to about 200° C. preferably from 20° C. to about 100° C. When heat alone is used to initiate free radical formation higher temperatures will be necessary, e.g. between about 50° C. and about 350° C., preferably between about 100° C. and about 250° C.

Pressure is not critical and may be from say 10 mm. Hg absolute to 50 atmospheres, usually from 0.5 to 15 atmospheres. The reaction time may vary from ½ hour to say one week, normally from about 5 hours to about three days. Normally between about 0.1 and about 10 moles of oxygen ($O_2$) will be present per mole of fluoro compound.

As noted in my copending application, carboxylic acids are also obtained as products.

The following specific examples are given for purposes of illustration only and are not to be taken as in any way limiting the invention beyond the scope of the appended claims. In the examples temperatures are given in degrees centigrade unless otherwise stated.

Examples 1 to 6 deal with coupling reactions in which the reactants are energized by means of mercury and ultra violet light. In carrying out these examples, enough clean dry mercury was admitted to a Vycor tube (No. 7900 or 7910) to extend the surface nearly the length of the tube in horizontal position. The iodide starting material together with an approximately equal volume of 1,1,2-trichloro-1,2,2-trifluoroethane, when necessary to decrease the viscosity of the reaction mixture, was added. After sealing in vacuo or under a high-purity dry nitrogen atmosphere the tube was mounted horizontally and shaken end to end while exposed to the ultraviolet irradiation of a Hanovia SH burner used without the Woods filter.

The solids which began to form almost immediately increased in amount and underwent changes in colour and texture from a red crystalline form which adhered tenaciously to the tube walls through orange, brown, and finally to finely dispersed black particles as the coupling proceeded to completion.

When the "black stage" was reached, generally after 72 to 160 hours exposure, the tube was cooled in Dry Ice to immobilize the remaining mercury, opened, and the liquid portion was decanted through a filter directly into the pot of a Vigreux distillation unit. The solids remaining in the tube were extracted in this fashion with several small portions of fresh 1,1,2-trichloro-1,2,2,-trifluoroethane, and the extracts were added to the still pot. After removal of the solvent by distillation at one atmosphere, the residue was fractionated under reduced pressure. The coupled products were clear colourless oils or solids.

*Coupling secondary iodides with mercury and ultra-violet light*

EXAMPLE 1

4.5 grams (0.010 mole) of 2-iodoperfluorohexane and 10 ml. of mercury were sealed in a Vycor 7910 tube under a dry nitrogen atmosphere and shaken end to end for 72 hours, while exposed to irradiation from a Hanovia ultra-violet lamp at a distance of 5 inches. On working up, 3 grams of perfluoro-5,6-dimethyldecane were isolated representing a 94% conversion. The product had a boiling point of 95° C. at 45 mm. and an index of refraction $n_D^{20} = 1.2945$.

EXAMPLE 2

Following the procedure of Example 1, $$C_3F_7[CF_2CF(CF_3)]_2I$$

was subjected to ultra-violet radiation in the presence of mercury. An 89% conversion to $$(C_3F_7[CF_2CF(CF_3)]_2)_2$$

was obtained. This material boiled at 127° C. at 10 mm. and had an index of refraction $n_D^{28} = 1.3079$.

EXAMPLE 3

Following the procedure of Example 1, $$C_3F_7[CF_2CF(CF_3)]_{3av.}I$$

was subjected to ultra-violet radiation in the presence of mercury. An 88% conversion of $$(C_3F_7[CF_2CF(CF_3)]_{3av.})_2$$

was obtained. This substance had a boiling point range of 120–152° C. <0.1 mm. and an index of refraction, $n_D^{39} = 1.3137$.

EXAMPLE 4

Following the procedure of Example 1, $$C_3F_7[CF_2CF(CF_3)]_{4AV.}I$$

was subjected to ultra-violet radiation in the presence of mercury. A 76% conversion to $$(C_3F_7[CF_2CF(CF_3)]_{4AV.})_2$$

was obtained. This material boiled at 159–193° C. at <0.1 mm.

EXAMPLE 5

Following the procedure of Example 1, $$CF_3[CF_2CF(CF_3)]_2I$$

was subjected to ultra-violet radiation in the presence of mercury. An 85% conversion to $(CF_3[CF_2CF(CF_3)]_2)_2$ was obtained. The product boiled at 93° C. at 10 mm. and had an index of refraction $n_D^{25} = 1.3040$.

EXAMPLE 6

Following the procedure of Example 1, $$CF_3[CF_2CF(CF_3)]_3I$$

was subjected to ultra violet radiation in the presence of mercury. A 78% conversion to $(CF_3[CF_2CF(CF_3)]_3)_2$ was obtained. This product boiled at 94–95° C. at 0.1 mm. and had an index of refraction $n_D^{26} = 1.3152$.

*Coupling secondary iodide with heat and mercury*

EXAMPLE 7

$C_3F_7[CF_2CF(CF_3)]I$ (4.5 g.) and mercury 10 ml. were treated in a sealed tube at 150° C. for 1 day. A small yield of coupled product $$C_3F_7[CF_2CF(CF_3)][(CF_3)CFCF_2]C_3F_7$$

was obtained.

EXAMPLE 8

$C_3F_7[CF_2CF(CF_3)]_2I$ (21.5 g.) and mercury (10 ml.) were heated in a flask at 120° C. with stirring for 1 day. A low yield of coupled product, $$C_3F_7[CF_2CF(CF_3)]_2[(CF_3)CFCF_2]_2C_3F_7$$

was obtained.

Coupling secondary iodides with heat alone

EXAMPLE 9

30 grams of $C_3F_7[CF_2CF(CF_3)]_nI$ where $n=3$ were sealed under a dry nitrogen atmosphere in a 65 ml. Monel autoclave and heated at 258–262° C. for 16 hours. The autoclave was cooled and vented in vacuo to a Dry Ice-cooled trap in which 10 g. (33% of the total product) of perfluoropropene were condensed. The autoclave was opened and the remaining 18.9 g. of oil was fractionated under reduced pressure.

Approximately 30% of this product was 2-iodoperfluorohexane and approximately 25% was other coupling products, not specifically identified.

Preparation of the tertiary compounds $(CF_3)_2CH \cdot CI(CF_3)_2$
$(CF_3)_2CH \cdot CBr(CF_3)_2$ and $(CF_3)_2CH \cdot CCl(CF_3)_2$

EXAMPLE 10

The iodo compound, $(CF_3)_2CH \cdot CI(CF_3)_2$ was prepared by the following reaction $$CF_3 \cdot C:C \cdot CF_3 \xrightarrow{CF_3I} (CF_3)_2C:CI \cdot CF_3 \longrightarrow (CF_3)_2C:CH \cdot CF_3$$

$$(CF_3)_2C:CH \cdot CF_3 \xrightarrow{CF_3I} (CF_3)_2CI \cdot CH(CF_3)_2$$

The product had a boiling point of 131° C. and could be dehydroiodinated to the olefin $(CF_3)_2C=C(CF_3)_2$, B.P. 55–56° C.

EXAMPLE 11

The bromo compound $(CF_3)_2CH \cdot CBr(CF_3)_2$, B.P. 115–119° C. was prepared by treatment of the iodo-compound $(CF_3)_2CH \cdot CI(CF_3)_2$ prepared as above, with a 20% excess of bromine in the dark for 3 days followed by exposure to light for four hours. Yield 69%. It could be dehydrobrominated to $(CF_3)_2C:C(CF_3)_2$ in 53% yield.

EXAMPLE 12

The chloro compound $(CF_3)_2CH \cdot CCl(CF_3)_2$ B.P. 100–101° C. was prepared in 71% yield by reaction of $(CF_3)_2CH \cdot CI(CF_3)_2$, prepared as above wth a 20% excess of chlorine in the dark for 1 day followed by exposure to light for four hours. Dehydrochlorination yielded $(CF_3)_2C:C(CF_3)_2$ (47%).

The following examples illustrate the coupling of the tertiary iodide, bromide and chloride whose preparation has just been described.

Coupling of $(CF_3)_2CH \cdot CI(CF_3)_2$

EXAMPLE 13

*By heat alone.*—The iodo-compound (2.4 g.) was heated to 220° in a silica tube (with air carefully excluded) for 24 hours, then at 240° for six hours. Solid iodine was liberated, and distillation of the liquid products gave unchanged iodo-compound (18%) and 2,3,3,4,4,5-hexa(trifluoromethyl)-1,1,1,6,6,6-hexafluorohexane, $(CF_3)_2CH \cdot C(CF_3)_2 \cdot C(CF_3)_2 \cdot CH(CF_3)_2$ (56%) B.P. 96–98°/20 mm., micro B.P. 203–205°. (Found: C, 23.9; H, 0.4%. $C_{12}H_2F_{24}$ requires C, 23.9; H, 0.4%.)

EXAMPLE 14

*By mercury and heat.*—The iodo-compound (3.2 g.) and mercury (15 ml.), heated and shaken at 100° for 8 hours, at 150° for four hours, and at 210° for 4 hours, gave a product which was extracted by ether from the mercuric iodide then distilled to give $(CF_3)_2CH \cdot C(CF_3)_2 \cdot C(CF_3)_2 \cdot CH(CF_3)_2$ (69%).

EXAMPLE 15

*By mercury and light.*—The iodo-compound (3.2 g.) and mercury (15 ml.), shaken vigorously and irradiated in a silica tube for 24 hours, gave the coupled product $(CF_3)_2CH \cdot C(CF_3)_2 \cdot CH(CF_3)_2$ in 73% yield. Use of perfluoromethylcyclohexane (10 ml.) as solvent (substantially transparent to ultraviolet light down to 2200 A.) in a second experiment increased the yield of coupled product to 79%.

EXAMPLE 16

*By use of iron and heat.*—The iodo-compound (2.8 g.) and iron filings (2.1 g.) were shaken vigorously in a sealed Pyrex tube and heated to 175° for eight hours. Extraction by ether, washing of the ethereal extracts with water, then distillation gave $(CF_3)_2CH \cdot C(CF_3)_2 \cdot C(CF_3)_2 \cdot CH(CF_3)_2$ in 24% yield. The olefin $(CF_3)_2CH \cdot C(CF_3):CF_2$, B.P. 68–69°. (Found: M, 281. $C_6HF_{11}$ requires M, 282) was produced in 34% yield by deiodofluorination.

EXAMPLE 17

*By zinc and light.*—The iodo-compound (2.0 g.) zinc powder (2.1 g.) and perfluoromethylcyclohexane (10 ml.), shaken vigorously in a sealed silica tube and exposed to ultraviolet light for 28 hours, gave unchanged iodo-compound (27%) and the $C_{12}H_2F_{24}$ coupled product (44%).

EXAMPLE 18

*By iron and light.*—A parallel experiment to Example 5 above using iron powder instead of zinc powder gave the coupled product in 38% yield.

EXAMPLE 19

*By zinc and dioxane.*—The iodo-compound (4.8 g.), zinc (3.6 g.), and purified anhydrous dioxane (25 ml.) were stirred vigorously at 10° for three hours, then the temperature was raised slowly to reflux during 10 hours. Filtration, addition of an excess of water, and distillation of the organic layer gave the coupled product in 71% yield and the olefin $(CF_3)_2CH \cdot C(CF_3):CF_2$ in 12% yield.

EXAMPLE 20

*By zinc and ethanol.*—A parallel reaction to Example 7 above using anhydrous ethanol instead of dioxan gave the coupled product in 15% yield, the olefin $C_6HF_{11}$ in 27% yield, and the reduction product $(CF_3)_2CH \cdot CH(CF_3)_2$ in 47% yield.

EXAMPLE 21

*By zinc and acetic anhydride.*—Example 7 was repeated using acetic anhydride instead of dioxan. The yield of coupled product was 52%, of olefin was 28%, and of reduction product was approximately 5%.

EXAMPLE 22

*By magnesium and light.*—Example 6 was repeated using magnesium powder instead of iron powder. The yield of coupled product was 48%.

EXAMPLE 23

*By copper and light.*—Example 6 was repeated using copper powder instead of iron powder. The yield of coupled product was 50%.

EXAMPLE 24

*By mercury and light with benzene as a solvent.*—The iodo-compound (3.2 g.), benzene (12 ml.) and mercury (15 ml.) were shaken vigorously in a silica tube and exposed to ultraviolet light for 7 days. Filtration and distillation gave the coupled product in 66% yield.

EXAMPLE 25

*By mercury and light with n-butanol as solvent.*—Example 7 was repeated using anhydrous n-butanol instead of dioxan and mercury instead of zinc. The yield of coupled product and olefin were 17% and 19% respectively.

EXAMPLE 26

*By infrared radiation in presence of mercury.*—Example 3 was repeated using a Pyrex tube ("Pyrex" is a registered trade mark) exposed to the radiation from two infrared lamps. The yield of coupled product was 33% after 24 hours and 57% after 128 hours.

EXAMPLE 27

*By visible light in presence of mercury.*—Example 3 was repeated using a Pyrex tube which shields off radiation of wavelength less than 3000 A. The tube was exposed to strong radiation of wavelength 3000–5000 A. for 14 days to give a yield of coupled product of 22% with 64% of the iodo-compound unchanged.

EXAMPLE 28

*By use of aqueous potassium iodide and light.*—The iodo-compound (3.9 g.) and 20% of aqueous potassium iodide (25 ml.) were vigorously shaken in a silica tube and exposed to ultraviolet light for 15 days. The solution went deep brown. Extraction by ether and distillation gave unchanged iodo-compound (43%) and the coupled product (34%).

EXAMPLE 29

*By cyanogen and light.*—The iodo-compound (2.6 g.) was sealed in a silica tube with an excess (200%) of cyanogen, shaken vigorously, and exposed to ultraviolet light for ten days. Iodine cyanide was produced, and ether extraction, followed by washing with water, drying, and distillation, gave the coupled product in 69% yield.

EXAMPLE 30

*By aqueous sodium thiosulphate and light.*—Example 16 was repeated using 10% aqueous sodium thiosulphate instead of aqueous potassium iodide. The yield of coupled product was 18%.

EXAMPLE 31

*By dilute aqueous alkali and light.*—Example 16 was repeated using 0.5 aqueous sodium hydroxide (300% excess) instead of aqueous potassium iodide. The yield of coupled product was 24%, of $(CF_3)_2C:C(CF_3)_2$ 31%, of unchanged iodo-compound was 19%. Unknown olefinic material of high B.P. was also produced.

EXAMPLE 32

*By zinc and ether.*—Example 5 was repeated using anhydrous diethyl ether as the solvent. The yield of coupled product was 23%. Reaction in a sealed tube at 70–80% gave a 56% yield of coupled product.

*Coupling of* $(CF_3)_2CH \cdot CBr(CF_3)_2$

EXAMPLE 33

*By heat alone.*—Example 1 was repeated using the bromo-compound instead of the iodo-compound. The yield of coupled product was 31%. Bromine was liberated as expected, but the formation of hydrogen bromide showed that replacement of hydrogen by bromine had occurred to some extent.

EXAMPLE 34

*By mercury and heat.*—The bromo-compound (1.9 g.) and mercury (10 ml.), heated and shaken at 210–220° for 24 hours, gave the coupled product in 47% yield.

EXAMPLE 35

*By mercury and light.*—The bromo-compound (2.6 g.) and mercury (12 ml.), shaken vigorously and irradiated in a silica tube by a powerful ultraviolet source for six days gave the coupled product in 61% yield.

EXAMPLE 36

*By zinc and dioxane.*—The bromo-compound (3.6 g.) zinc (3.1 g.), and purified anhydrous dioxane (25 ml.) were stirred vigorously then heated slowly to reflux temperature during eight hours. After a further three hours the products were examined and shown to contain the coupled product in 44% yield.

*Coupling of* $(CF_3)_2CH \cdot CCl(CF_3)_2$

EXAMPLE 37

*By heat, light and mercury.*—The chloro-compound (3.1 g.) and mercury (20 ml.) were shaken vigorously and heated to 200–230° in a silica tube and exposed to intense ultraviolet light for 14 days. Extraction by ether and distillation gave the coupled product in 18% yield and unchanged chloro-compound (71%).

EXAMPLE 38

*By zinc and dioxane.*—The chloro-compound (3.3 g.), zinc, (3.2 g.), and purified anhydrous dioxanes (25 ml.) were shaken vigorously and heated at 100–120° in a sealed Pyrex tube for 72 hours. The yield of coupled product was 15% and of $(CF_3)_2CH \cdot C(CF_3):CF_2$ was 28%. Unchanged chloro-compound (37%) was recovered.

EXAMPLE 39

A polytetrafluoroethylene tape, 5 mils thick and 0.1 inch wide was immersed in the coupled product

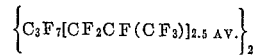

prepared as in Examples 8 and 9, at 100° C. overnight. After removal of excess oil the tape was found to have increased tensile strength and elongation.

The compounds prepared according to the invention have a variety of different uses. As shown in Example 39 certain of them are valuable as plasticizers. Others are of particular value as lubricants. For example compounds of the type $[R_f[CF_2CF(CF_3)]_{3-4}]_2$ are oils which can be used to lubricate motors and agitators operating in HF or $F_2$ atmospheres. In such situations they remain effective for extended periods of time without the breakdown or ignition which would be experienced with hydrocarbon. The compound $(CF_3)_2CH \cdot CBr(CF_3)_2$ is a good fire extinguisher and can also be used as fuel additive. The compound $(CF_3)_2CH(CF_3)_2CC(CF_3)_2CH(CF_3)_2$ is highly stable and is used successfully as a monometer fluid, particularly where corrosion problems would be encountered, e.g. across an orifice through which HF, $F_2$ or $Cl_2$ is flowing. The sulphonic acids and carboxylic acids whose preparation has been described have surface active properties and they or their alkali metal salts are used, for example, as adjuvant in chrome plating baths (say 0.3% concentration to prevent expensive losses from such baths. They are also useful in the aqueous persulfate polymerization of chlorotrifluoroethylene, to increase the molecular size of the product.

What is claimed is:
1. Compounds having the general formula

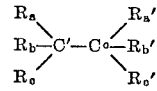

where $R_a$ and $R_b$ are selected from the group consisting of halogen and halogenoalkyl groups having not more than 20 carbon atoms, and $R_a'$, $R_b'$, $R_c$ and $R_c'$ are halogenoalkyl groups having not more than 20 carbon atoms, provided that $R_c'$ has as least two halogen atoms other than iodine attached to the carbon atom adjacent the $C^o$ carbon atom, and that when both $R_a$ and $R_b$ are halogenoalkyl, $R_c$ has at least two halogen atoms other than iodine attached to the $C'$ carbon atom.

2. The compounds claimed in claim 1 wherein C' is a primary carbon atom.

3. The compounds claimed in claim 1 wherein C' is a secondary carbon atom.

4. The compounds claimed in claim 1 wherein C' is a tertiary carbon atom.

5. Compounds having the general formula

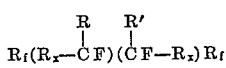

where $R_f$ is selected from the class consisting of perfluoroalkyl and perfluorochloroalkyl groups, having from 1 to about 20 carbon atoms, where $R_x$ is a perfluoroalkylidene group having from 1 to about 4 carbon atoms, where R is selected from the class consisting of fluorine and perfluoroalkyl groups having not more than about 20 carbon atoms and where R' is selected from the class consisting of perfluoroalkyl groups having not more than about 20 carbon atoms.

6. Compounds having the general formula

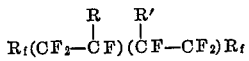

where $R_f$ is selected from the class consisting of perfluoroalkyl and perfluorochloroalkyl groups, having from 1 to about 20 carbon atoms, where R is selected from the class consisting of fluorine, and perfluoroalkyl groups having not more than about 20 carbon atoms and where R' is selected from the class consisting of perfluoroalkyl groups having not more than about 20 carbon atoms.

7. Compounds having a total of not more than about 50 carbon atoms and having the general formula $$R_f[CF_2CF(CF_3)]_n[(CF_3)CFCF_2]_nR_f$$

where $R_f$ is selected from the class consisting of perfluoroalkyl and perfluorochloroalkyl groups having from 1 to about 20 carbon atoms and $n$ is a number from 1 to about 20.

8. Compounds having the general formula $$CF_3[CF_2CF(CF_3)]_n[(CF_3)CFCF_2]_nCF_3$$

where $n$ is a number from 1 to about 20, the total number of carbon atoms in the molecule not exceeding about 50.

9. Compounds having the general formula $$C_3F_7[CF_2CF(CF_3)]_n[(CF_3)CF(CF_2)]_nC_3F_7$$

where $n$ is a number from 1 to about 20, the total number of carbon atoms in the molecule not exceeding about 50.

10. The compound

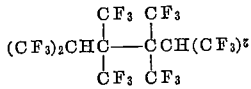

11. A method of making compounds of the class

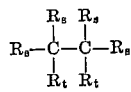

where $R_s$ is selected from the class consisting of perfluoroalkyl and perfluorochloroalkyl groups having from 1 to about 20 carbon atoms, and where $R_t$ is selected from the class consisting of chlorine, fluorine, perfluoroalkyl and perfluorochloroalkyl groups having from 1 to about 20 carbon atoms, perfluorocycloalkyl and perfluorochlorocycloalkyl groups having from 3 to 6 carbon atoms, perfluoroaryl and perfluorochloroaryl groups which comprises coupling two molecules having the structure

by reacting them with molecular oxygen.

12. A method for making compounds having the general formula

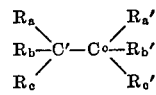

where $R_a$ and $R_b$ are selected from the group consisting of halogen and halogenoalkyl groups having from 1 to 20 carbon atoms, and $R_a'$, $R_b'$ and $R_c$ and $R_c'$ are halogenoalkyl groups having not more than 20 carbon atoms, provided that $R_c'$ has at least 2 halogen atoms other than iodine attached to the carbon atom adjacent the $C^o$ carbon atom and that when both $R_a$ and $R_b$ are halogenoalkyl, $R_c$ has at least two halogen atoms other than iodine attached to the carbon atom adjacent to the C' carbon atom, which comprises coupling a compound having the formula

with a compound having the formula

where Z is selected from the group consisting of chlorine, bromine and iodine, by reacting said compounds with a dehalogenating metal in the presence of an organic solvent which is a Lewis base and which has a dielectric constant greater than 1.5.

13. A method for making compounds having the general formula

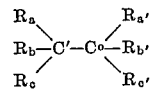

where $R_a$ and $R_b$ are selected from the group consisting of halogen and halogenoalkyl groups having from 1 to 20 carbon atoms, and $R_a'$, $R_b'$, $R_c$ and $R_c'$ are halogenoalkyl groups having not more than 20 carbon atoms provided that $R_c'$ has at least 2 halogen atoms other than iodine attached to the carbon atom adjacent the $C^o$ carbon atom and that when both $R_a$ and $R_b$ are halogenoalkyl, $R_c$ has at least two halogen atoms other than iodine attached to the carbon atom adjacent to the C' carbon atom, which comprises coupling a compound having the formula

with a compound having the formula

where Z is selected from the group consisting of chlorine, bromine and iodine, by reacting said compounds with a dehalogenating metal selected from the group consisting of zinc, magnesium, tin, iron, aluminum, copper and cadmium in the presence of an organic solvent having a dielectric constant greater than 1.5.

(References on following page)

References Cited by the Examiner

UNITED STATES PATENTS

| | | | |
|---|---|---|---|
| 2,174,506 | 9/1939 | Fox | 260—503 |
| 2,181,890 | 12/1939 | Harris | 260—503 |
| 2,392,316 | 1/1940 | Dreyfus | 260—533 |
| 2,404,374 | 7/1946 | Harman | 260—648 |
| 2,432,997 | 12/1947 | Ligett et al. | 260—648 |
| 2,450,858 | 10/1948 | Fitzpatrick et al. | 260—537 |
| 2,504,034 | 4/1950 | Morrell et al. | 260—533 |
| 2,649,477 | 8/1953 | Jacobs et al. | 260—533 |
| 2,668,182 | 2/1954 | Miller | 260—653.5 |
| 2,670,387 | 2/1954 | Gotlieb et al. | 260—653.5 |
| 2,705,229 | 3/1955 | Ruh et al. | 260—653 |
| 2,716,141 | 8/1955 | Miller | 260—653 |
| 2,732,398 | 1/1956 | Brice et al. | 260—503 |
| 2,771,487 | 11/1956 | Morris et al. | 260—514 |
| 2,784,221 | 3/1957 | Bordenca | 260—514 |
| 2,824,891 | 2/1958 | Pollitzer | 260—503 |
| 2,833,851 | 5/1958 | Haszeldine | 260—653 |
| 2,852,565 | 9/1958 | Nozalki | 260—503 |

FOREIGN PATENTS 774,103   5/1957   Great Britain.

OTHER REFERENCES

Fieser et al., Organic Chemistry, 1944 pp. 38 and 39, Heath & Company, Boston.

Fuson, Advanced Organic Chemistry, 1950, pp. 133 and 134, John Wiley & Sons, Inc., New York.

Haszeldine, Jour. Chem. Socl, 1952, 4423–4431.

Haszeldine et al., Jour. Chem. Sox., May 1953 pp. 1592–1600.

Hudlicky, Chemistry of Organic Fluorine Compounds, pp. 263 and 267 (1962 Ed.) The Macmillan Co., New York, N.Y.

Simons, Fluorine Chemistry, vol. 1, page 402 (1950), Academic Press, New York, N. Y., Copy in Group 120, AD 181. F1 S48 V. i Copy 2.

LEON ZITVER, *Primary Examiner.*

D. D. HORWITZ, J. WILLIAMS, *Assistant Examiners.*

UNITED STATES PATENT OFFICE
CERTIFICATE OF CORRECTION

Patent No. 3,317,618                          May 2, 1967

Robert Neville Haszeldine

It is hereby certified that error appears in the above numbered patent requiring correction and that the said Letters Patent should read as corrected below.

Column 6, line 4, for "$R_x CX'Y'Z$" read -- $R_x CX'Y'Z'$ --; column 7, line 16, for "$R_g R_h X''$" read -- $R_g R_h X''Z$ --; same column 7, lines 34 to 39, the formula should appear as shown below instead of as in the patent:

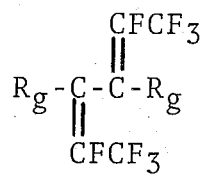

same column 7, lines 45 to 49, the left-hand formula should appear as shown below instead of as in the patent:

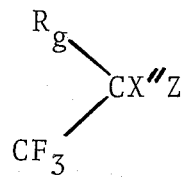

column 10, line 12, the formula should appear as shown below instead of as in the patent:

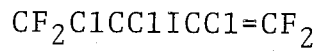

same column 10, lines 63 to 65, the formula should appear as shown below instead of as in the patent:

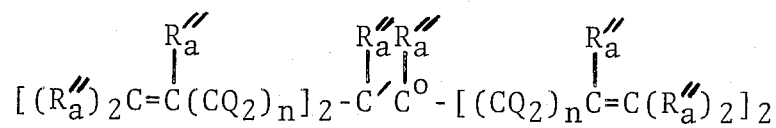

column 11, line 62, before "perfluorochloroaryl" insert -- perfluoro or --; column 12, line 11, the formula should appear as shown below instead of as in the patent:

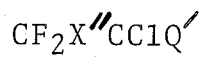

same column 12, line 16, the formula should appear as shown below instead of as in the patent:

3,317,618
(2)

$$CF_2X''CC1Q'[R_p][R_p']CC1Q'CF_2X''$$

column 13, lines 34 and 35, the formula should appear as shown below instead of as in the patent:

$$CF_2=\underset{CF_3}{C}[CF_2-CF(CF_3)]_{n-1}[(CF_3)CF-CF_2]_{n-1}\underset{CF_3}{C}=CF_2$$

column 14, above "Formula 3" insert the formula:

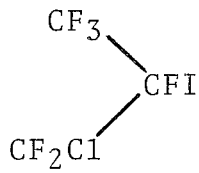

column 18, line 2, the formula should appear as shown below instead of as in the patent:

$$(CF_3)_2CH \cdot C(CF_3)_2 \cdot C(CF_3)_2 \cdot CH(CF_3)_2$$

column 21, lines 50 to 54, the formula should appear as shown below instead of as in the patent:

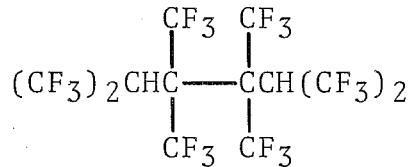

column 23, line 20, for "2,833,851" read -- 2,833,831 --;
column 24, line 10, for "Socl" read -- Soc. --;  line 11, for "Sox." read -- Soc. --; line 12, before "Hudlicky" insert
-- Henne, Jour. Am. Chem. Soc., 75, 5750, Nov. 20, 1953.
   Henne et al., Jour. Am. Chem. Soc., 77, 2334-2335,
   April 20, 1955. --;
same column 24, line 14, after "263" insert -- , 264 --.

Signed and sealed this 28th day of January 1969.

(SEAL)
Attest:

EDWARD M. FLETCHER, JR.                    EDWARD J. BRENNER
Attesting Officer                          Commissioner of Patents

CERTIFICATE OF CORRECTION

Patent No. 3,317,618                                          May 2, 1967

Robert Neville Haszeldine

It is hereby certified that error appears in the above numbered patent requiring correction and that the said Letters Patent should read as corrected below.

Column 6, line 4, for "$R_xCX'Y'Z$" read -- $R_xCX'Y'Z'$ --; column 7, line 16, for "$R_gR_hX''$" read -- $R_gR_hX''Z$ --; same column 7, lines 34 to 39, the formula should appear as shown below instead of as in the patent:

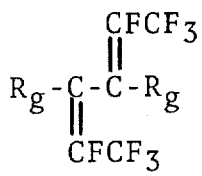

same column 7, lines 45 to 49, the left-hand formula should appear as shown below instead of as in the patent:

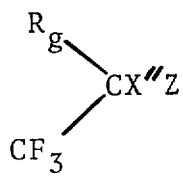

column 10, line 12, the formula should appear as shown below instead of as in the patent:

same column 10, lines 63 to 65, the formula should appear as shown below instead of as in the patent:

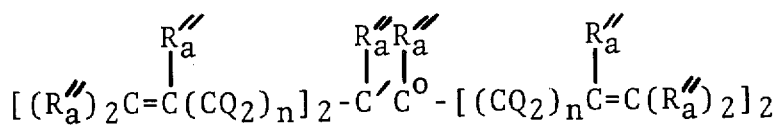

column 11, line 62, before "perfluorochloroaryl" insert -- perfluoro or --; column 12, line 11, the formula should appear as shown below instead of as in the patent:

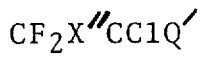

same column 12, line 16, the formula should appear as shown below instead of as in the patent:

$$CF_2X''CC1Q'[R_p][R_p']CC1Q'CF_2X''$$

column 13, lines 34 and 35, the formula should appear as shown below instead of as in the patent:

$$CF_2=\underset{\underset{CF_3}{|}}{C}[CF_2-CF(CF_3)]_{n-1}[(CF_3)CF-CF_2]_{n-1}\underset{\underset{CF_3}{|}}{C}=CF_2$$

column 14, above "Formula 3" insert the formula:

$$\underset{CF_2Cl}{\overset{CF_3}{\diagdown}}CFI$$

column 18, line 2, the formula should appear as shown below instead of as in the patent:

$$(CF_3)_2CH \cdot C(CF_3)_2 \cdot C(CF_3)_2 \cdot CH(CF_3)_2$$

column 21, lines 50 to 54, the formula should appear as shown below instead of as in the patent:

$$(CF_3)_2CH\underset{\underset{CF_3}{|}}{\overset{\overset{CF_3}{|}}{C}}\text{———}\underset{\underset{CF_3}{|}}{\overset{\overset{CF_3}{|}}{C}}CH(CF_3)_2$$

column 23, line 20, for "2,833,851" read -- 2,833,831 --;
column 24, line 10, for "Socl" read -- Soc. --; line 11, for "Sox." read -- Soc. --; line 12, before "Hudlicky" insert
-- Henne, Jour. Am. Chem. Soc., 75, 5750, Nov. 20, 1953.
   Henne et al., Jour. Am. Chem. Soc., 77, 2334-2335,
   April 20, 1955. --;
same column 24, line 14, after "263" insert -- , 264 --.

Signed and sealed this 28th day of January 1969.

(SEAL)
Attest:

EDWARD M. FLETCHER, JR.
Attesting Officer

EDWARD J. BRENNER
Commissioner of Patents